Dec. 1, 1970  J. V. LEEBENS  3,544,332
PROCESS FOR MAKING CEREAL FLAKES CONTAINING ENTRAPPED ADDITIVES
Filed Feb. 2, 1967
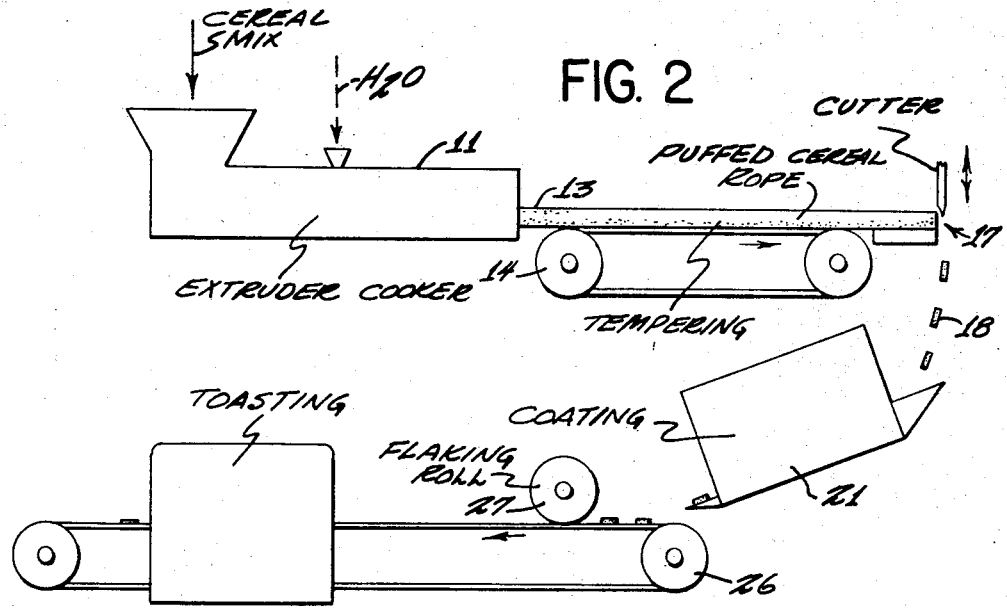
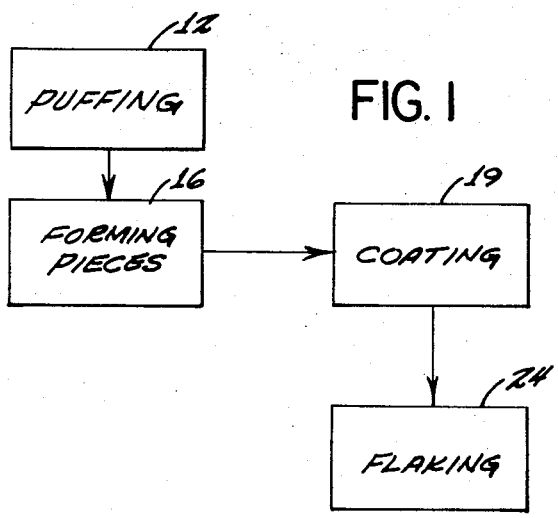
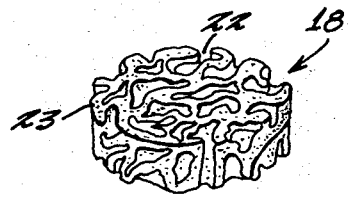
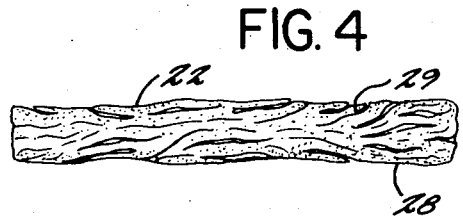
INVENTOR.
JAMES V. LEEBENS
BY
Harold D. Jastram
ATTORNEY

United States Patent Office 3,544,332
Patented Dec. 1, 1970

3,544,332
PROCESS FOR MAKING CEREAL FLAKES CONTAINING ENTRAPPED ADDITIVES
James V. Leebens, Minneapolis, Minn., assignor to General Mills, Inc., a corporation of Delaware
Filed Feb. 2, 1967, Ser. No. 613,664
Int. Cl. A23l 1/10
U.S. Cl. 99—83
9 Claims

ABSTRACT OF THE DISCLOSURE

A process for incorporating powdered additives into ready to eat cereal flakes by puffing a cereal dough to form voids in the dough, forming the puffing dough into pieces, coating the pieces with the powdered additive to cover the surface and voids of the pieces, and then flaking the pieces to entrap the powdered additives in the flakes.

BACKGROUND OF INVENTION

This invention relates to ready to eat cereal flakes and a process for producing ready to eat cereal flakes and more particularly it pertains to a ready to eat cereal flake which contains a powdered additive and a method for applying the powdered additive to ready to eat cereal flakes.

Ready to eat breakfast cereals in flake form have been produced by the cereal industry for many years. These ready to eat cereal flakes are formed from many cereal grains including wheat, rice, oats, corn and the like or combinations thereof. The ready to eat cereal flakes have been enriched, flavored, and sweetened by various methods. A common method of applying such additives to cereal flakes is to incorporate the flavoring, sweetening, or enriching material in the dough of the cereal dough mixture prior to cooking of the dough. The mixture is then normally cooked in a conventional cooker after which the dough is formed into pellets which are then flattened in a process step called "flaking." The cooking apparatus can be of several commonly used types and it may be a batch type cooker, a continuous type cooker, an extruder cooker or the like. The pellets, which are formed after the dough is cooked, are flattened in apparatus such as flaking rollers which are conventional and well known in the industry. After the flaking step, the flakes are frequently toasted to develop the flavor of the flakes. Heating frequently will carmelize ingredients in the dough mix to enhance the flavor of the dough and accordingly, in some applications forms a desirable step in the conventional production of ready to eat cereal flakes.

Addition of flavoring agents, enriching agents, and similar additives to the dough mix prior to cooking places certain limitations on a choice of the additives which may be used. If the additives are heat sensitive, care must be taken to avoid destructive temperatures during the cooking. Frequently, additives cannot be used simply because the cooking temperatures necessary are too high and will destroy the desirable characteristics of the additive which might otherwise be chosen. Further, flavored characteristics are frequently recognized by the flavor which is on the outside or near the surface of a food product and which come in contact with the tongue as the food product is placed in the mouth. Many of the additives which are incorporated into the dough are so thoroughly mixed in the dough that the consumer does not recognize immediately the flavor desired.

Further, a recent trend to the use of sugar coated flakes has developed with the accompanying problem of applying sufficient sugar to the outer surface of the individual flakes to produce a truly sugar coated product.

Application of sugar to the flakes is difficult since there is a tendency for the crystallized sugar to break away from the outer surface of the flake and therefore destroy the sugar coating of the flakes.

It is therefore an object of the present invention to provide a new and improved ready to eat cereal flake in which additives are incorporated in the flake at or near the surface thereof.

It is a further object of the present invention to provide a new and improved ready to eat breakfast cereal flake in which additives such as flavoring, enriching agents, and sweetening agents are added to the outer surface of the flake or entrapped in breaks in the flake near the surface thereof.

It is a further object of the present invention to provide a method of applying additives to ready to eat breakfast cereal flakes.

It is a further object of the present invention to provide a new and improved method of applying additives such as flavoring, sweetening and enriching agents to ready to eat breakfast cereal flakes whereby the agents are incorporated in the flake at or near the surface of the flake and are entrapped in breaks in the flake.

SUMMARY

A product according to the present invention is a ready to eat breakfast cereal flake which is formed from a cereal grain product and which is cooked in the form of a dough. Cereal grains which can be used to form the cereal dough are wheat, oats, rice, corn and the like or combinations of such cereal grains. Flavoring agents, enriching agents and similar additives are incorporated into the flake on or near the surface of the flake so that the flavor characteristics, for example, of the additives can be appreciated more thoroughly. The additives are incorporated in the flake by application of the additives in powdered or granular form to a puffed pellet or piece of the cereal which is then flaked according to conventional methods to entrap the additive in breaks in the final flaked product. The additives are applied after the cooking of the dough and are therefore not damaged by application of cooking temperatures to the dough. Further, the additives remain on or near the surface of the flake which comes in contact with the consumer's taste buds directly upon consumption of the product.

The process according to the present invention includes the steps of incorporating powdered additives into ready to eat flakes by puffing a cereal dough to form voids in the dough. The dough is then formed into pieces of puffed dough which are then coated by powdered or granular additive so that the outer surface and the walls of the voids contain a layer of powdered granular additive. The coated puffed pieces are then flaked to entrap the powdered additives in the flake at or near the surface of the flake.

BRIEF DESCRIPTION OF THE DRAWINGS

FIG. 1 is a block diagram of a process for producing ready to eat cereals having coating applied to the outer surface thereof, FIG. 2 is a further schematic diagram of a process for applying additives to ready to eat cereal flakes, FIG. 3 is an isometric view of a slice of puffed dough and FIG. 4 is a cross sectional view of a ready to eat breakfast cereal flake made according to the present invention.

DESCRIPTION OF THE PREFERRED EMBODIMENTS

For the purpose of illustrating the application of the principles of this invention, the invention will be described in connection with the use of wheat for production of the ready to eat breakfast cereal flakes. First, a cereal mix is produced which includes primarily a wheat flour which has added to it sugar, fat, salt and other selected ingredients. This mixture is directed, see FIG. 2, into an extruder cooker 11. It is to be understood that the cereal mix may be cooked by any one of several conventional cookers used in the cereal industry. The cereal mix is cooked to form a cereal dough. Temperatures above about 225° F. have been found sufficiently high to cook the dough. Sufficient water may be added to the cereal mix to raise the moisture content of the dough to the desired level which is usually between about 20% to about 30% H₂O by weight. In the present case using a wheat flour as the base for the product the moisture of the cooked dough is preferably between about 20 to about 25% by weight of the dough. After the dough has been properly cooked, if cooking is desired, the first essential step of the process for producing a product according to this invention is carried out, namely, puffing or expanding of the cereal dough. This step is illustrated in FIG. 1 of the drawings by box 12. The puffing may be carried out in conventional puffing guns or by other puffing methods. The preferred embodiment being illustrated here utilizes the extruder cooker 11 in which the cooked dough is extruded from the extruder cooker. Because the dough is under pressures above atmospheric in an extruder cooker, the dough will expand as it is extruded into a rope 13. This rope 13 of cereal dough is very hot, depending upon the temperature used to cook the dough, and it is in a puffed form with a moisture content of about 15% to about 20% by weight. Puffing and expanding will be used synonymously in this application to mean a condition wherein the volume of the cereal dough is greatly increased with the resultant production of large voids or holes in the dough.

Therefore, according to the preferred embodiment, a rope 13 of expanded dough is formed at the extruder outlet and may be deposited on a conveyor 14.

Next, the dough is formed into pieces which are the proper size for flaking. This step is illustrated also in FIG. 1 by box 16. The usual procedure in the cereal industry is to form pellets prior to flaking. In the preferred embodiment herein however, the dough rope 13 is cut into slices by a cutter 17. In order to prevent the cutter from becoming clogged with sticky material and to prevent the collapse of the expanded condition of the rope 13, the rope 13 is permitted to temper for a period after extrusion from the extruder cooker 11. This tempering constitutes a cooling period for the dough and permits the dough which demonstrates certain plastic characteristics to set. After the dough has set and possibly cooled to some extent, it may be cut more easily by the cutter 17.

The cutter 17 slices the rope which preferably is of uniform circular cross section illustrated by FIG. 3 of the drawings. These slices 18 are of uniform size and are of substantially the same thickness. The size will be determined by the size desired for the finished flake product. The slices 18 are then coated, see FIG. 1. The coating material will be additives such as flavoring agents, sweetening agents, enriching agents and the like. These additives are placed in a rotary drum 21 together with the slices 18. The pieces 18 are coated by the additive in the rotary drum 21 so that the additives which are in powder or granular form, form a layer of material on the outer surface 22 of the piece 18 and also form a layer of material on the surface or walls of voids 23 in the pieces 18.

After the pieces 18 have been thoroughly coated by the powdered or granular additives, the pieces are discharged from the rotary drum 21 and deposited on a belt 26 which cooperates with a flaking roller 27 to perform the flaking step 24 illustrated in FIG. 1. Flaking is defined in this application as the step of forming a flat flake of cereal dough as generally recognized in the cereal industry. A flaking roll 27 has been illustrated as cooperating with a conveyor belt 26 to form the flakes, however, it must be pointed out that any of the well known flaking techniques may be utilized to form a flake of the ready to eat cereal dough according to this invention.

During the flaking step the piece 18, which is a puffed piece containing many voids, is collapsed by the flaking roller 27 with the result that the voids 23 are closed and the piece is formed into a flake 28, see FIG. 4 of the drawings, which has a number of breaks 29 extending from the surface 22 of the flake toward the interior of the flake. The additives such as the flavoring, sweetening or enriching additives which were in granular form and which were sticking to the walls of the voids 23 and on the surface 22 of the expanded slice 18 are trapped in the breaks 29 when the pieces 18 are flaked in the flaking step. Consequently, the granular or powdered additives are trapped at or near the surface of the flake 28 so that when a consumer eats one of the flakes, the concentrated form of the additive is recognized by the consumer's taste buds and further, any additives which are difficult to incorporate into ready to eat cereal flakes may be incorporated in this manner without destruction due to cooking or the like. In other words, the additive is mechanically entrapped in the flake and therefore will remain in the flake during subsequent processing and sale of the product.

The ready to eat cereal now is in its finished flaked form, however, certain flavoring agents and texture characteristics may be achieved by the further step of toasting the flake. For this final step, the flakes may be subjected to toasting in which the flakes are toasted by conventional toasting techniques.

The invention will now be more fully understood from the following examples.

EXAMPLE I

A cereal mix having the following formula was prepared:

| | Percent |
|---|---|
| Sugar | 10 |
| Oil | 5 |
| Salt | 3 |
| Malt | 2 |
| Wheat flour | 80 |

This cereal mix was placed in an extruder cooker together with sufficient water to raise the moisture content of the mix to about 25% by weight. The mix was cooked at temperatures of about 240° and at pressures of about 2 p.s.i. to form a precooked cereal dough. The cooked dough was then extruded to form a rope of expanded dough. The extruded, expanded dough contained a moisture of about 22% by weight (moisture is lost when the dough is extruded). This dough rope which was expanded or puffed upon extrusion from the extruder cooker, was tempered ot permit the dough to set and cool to some extent. The rope was then sliced into uniform slices having substantially uniform thickness and cross sectional area. The slices were then coated with a mixture of the following ingredients which form the additive.

| | Percent |
|---|---|
| Sugar | 50 |
| Pulverized dehydrated strawberries | 50 |

After the product was coated, the pieces were flaked in flaking rollers to trap the granular or powdered additives in the cavities formed from in the extrusion process. The flakes were then toasted at temperatures of about 350° F. to about 400° F. to form a toasted ready to eat breakfast cereal.

EXAMPLE II

The ingredients and procedures for Example II are exactly the same as for Example I except that the additive was composed of 100% sugar.

It is to be understood that the above embodiments and specific examples are merely illustrative of the principles of the invention and are not to be construed as limitations thereof.

Now, therefore I claim:

1. A process for incorporating additives into cereal flakes which comprises:
   (a) puffing a cereal dough having an initial moisture content such that the puffed dough contains at least about 15% by weight moisture,
   (b) forming the puffed dough into pieces to be flaked,
   (c) mixing the pieces with said additives to deposit the additives on the surface of the voids of the puffed pieces and then,
   (d) flaking the puffed pieces to trap the additives at and near the surface of the flake.

2. A process in accordance with claim 1 in which the additives are flavoring agents.

3. A process in accordance with claim 1 which the additives are enriching agents.

4. A process in accordance with claim 1 in which the additives are a combination of flavoring and enriching agents.

5. A process in accordance with claim 1 in which the puffing is carried out by extruding the dough from an extruder in the form of a puffed rope and in which the pieces are formed by cutting the rope into flat slices to expose the voids.

6. A process in accordance with claim 1 which further includes toasting the cereal flakes.

7. A process for incorporating additives into cereal flakes which comprises cooking a cereal dough having a moisture content of between about 20% to about 30% by weight at elevated temperatures and at pressures above atmospheric in an extruder, extruding the cooked dough to form a rope of expanded dough to produce voids in the dough, tempering the rope to permit the dough to become firm, cutting the dough into pieces of uniform size, coating the outer surface and voids of the pieces with powdered additives flaking the pieces to collapse the voids and entrap the additives and then toasting the flakes.

8. A process in accordance with claim 7 in which the cereal is wheat and in which the moisture content of the extruded dough is about 22% by weight.

9. A process in accordance with claim 7 in which the cereal dough is extruded into a dough rope having a generally circular cross sectional surface and in which the rope is cut into slices which form pieces of uniform thickness.

References Cited
UNITED STATES PATENTS 3,318,705   5/1967   Clausi et al. _____ 99—81 XR LIONEL M. SHAPIRO, Primary Examiner J. R. HOFFMAN, Assistant Examiner U.S. Cl. X.R.

99—82